(12) United States Patent
Christensen et al.

(10) Patent No.: US 6,212,197 B1
(45) Date of Patent: Apr. 3, 2001

(54) APPARATUS AND METHOD FOR ACCESSING MEMORY IN A TDM NETWORK

(75) Inventors: Steven G. Christensen, Minneapolis, MN (US); James L. Jasmin, Freemont; David D. Clementson, Palo Alto, both of CA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 08/556,442

(22) Filed: Nov. 9, 1995

(Under 37 CFR 1.47)

Related U.S. Application Data

(63) Continuation of application No. 08/490,461, filed on Jun. 14, 1995, now Pat. No. 6,072,796.

(51) Int. Cl.$^7$ .................................................. H04L 12/66
(52) U.S. Cl. ............................................ 370/463; 370/503
(58) Field of Search .................................... 370/438, 442, 370/439, 458, 463, 468, 498, 503, 507, 508, 516, 517, 518, 519, 360, 375, 376, 379; 395/200.01, 200.2, 200.78, 200.79, 200.8; 340/825.2, 825.21; 327/141, 142, 153, 161, 261; 341/110; 375/355, 359, 362, 369, 370; 709/248

(56) References Cited

U.S. PATENT DOCUMENTS

| 4,224,688 | 9/1980 | Ciancibello et al. . |
|---|---|---|
| 4,271,502 | 6/1981 | Goutmann et al. . |
| 4,575,845 | 3/1986 | Baranyai et al. . |

(List continued on next page.)

OTHER PUBLICATIONS

An Audio Engineering Society Preprint, Presented at the 78th Convention May 3–6, 1895 Anaheim, "The Digital Audio Processing Station: A New Concept in Audio Post–Production", James A. Moorer et al, 2242 (D–4).

An Audio Engineering Society Preprint, Presented at the 89th Convention 1990 Sep. 21–25, Los Angeles, "Optimizing Massive Parallel Architectures for Real–Time Digital Audio", Ken N. Linton et al., Preprint #2972, Session–Paper#F–II–6.

An Audio Engineering Society Preprint, Presented at the 95th Convention Oct. 7–10, 1993 New York, "An Object Oriented System for Digital Audio Workstation DSP Development", Theodore C. Tanner, Jr. et al., 3754 (B3–PM–1).

An Audio Engineering Society Preprint, Presented at the 83rd Convention Oct. 16–19, 1987 New York, "A Magnetic Storage Disk–Based Digital Audio Recording, Editing, and Processing System", Charles L. Bagnaschi, 2505 (H–3).

Principles of Digital Audio, Second Edition, Eighth Printing—1994, Ken C. Pohlmann.

*Primary Examiner*—Wellington Chin
*Assistant Examiner*—Kwang B. Yao
(74) *Attorney, Agent, or Firm*—Fish & Neave; Jeffrey H. Ingerman

(57) ABSTRACT

An apparatus and method for transferring data among clients of a time division multiplexed network is provided. In one aspect of the preset invention the apparatus includes clock circuits that allow for a variable number of time slots and a variable bus cycle of the network. In another aspect of the present invention a network interface module includes an indirection register that contains relationships between memory storage locations and channels of a time domain multiplexed network. In yet another aspect of the present invention, a network interface module is provided that comprises a memory, and first and second registers. In one mode of operation of the network interface module, data from the memory for a client is pre-fetched from the memory, prior to the start of a bus cycle and is stored in the registers to minimize memory access delays in the system.

32 Claims, 7 Drawing Sheets

U.S. PATENT DOCUMENTS

| | | | |
|---|---|---|---|
| 4,646,288 | | 2/1987 | Shumway . |
| 4,797,877 | | 1/1989 | Pope et al. . |
| 4,819,228 | * | 4/1989 | Baran et al. .......................... 370/389 |
| 5,027,347 | | 6/1991 | Malkki . |
| 5,165,023 | * | 11/1992 | Gifford ................................. 395/311 |
| 5,197,065 | * | 3/1993 | Calvignac et al. ................... 370/378 |
| 5,235,594 | * | 8/1993 | Lee ....................................... 370/438 |
| 5,255,264 | * | 10/1993 | Cotton et al. ........................ 370/286 |
| 5,280,482 | * | 1/1994 | Kitamura et al. .................... 370/458 |
| 5,317,693 | * | 5/1994 | Cuenod et al. ....................... 395/275 |
| 5,357,511 | | 10/1994 | DiNapoli et al. . |
| 5,381,413 | * | 1/1995 | Tobagi et al. ........................ 370/448 |
| 5,402,388 | * | 3/1995 | Wojcicki et al. .................... 365/233 |
| 5,432,782 | * | 7/1995 | Suzuki ................................. 370/419 |
| 5,526,344 | * | 6/1996 | Diaz et al. ........................... 370/364 |
| 5,530,963 | * | 6/1996 | Moore et al. .................... 395/200.15 |
| 5,588,004 | * | 12/1996 | Suzuki et al. ........................ 370/516 |

\* cited by examiner

APPARATUS AND METHOD FOR ACCESSING MEMORY IN A TDM NETWORK

This application is a continuation of U.S. Ser. No. 08/490,461 filed Jun. 14, 1995, now U.S. Pat. No. 6,072,796.

BACKGROUND OF INVENTION

1. Field of Invention

This invention is directed to a method and apparatus for a cross-connected Time Division Multiplexed (TDM) digital audio bus for computer systems or stand alone recording/mixing systems. More specifically, the invention is directed toward the connection of multiple nodes to form a data network for processing and recording data in a digital audio system.

2. Discussion of the Related Art

Central conference controllers and Time Division Multiplex Networks are presently used in telephone systems. In these networks, remote stations consisting of telephones and data processing apparatus are connected to a central processing system. The processor at the central processing system receives data from each station, processes the data, and redistributes the processed data to all stations on the network. Examples of conference controllers using a central processing station are disclosed in U.S. Pat. Nos: 4,271,502, 4,224,688 and 5,027,347.

U.S. Pat. No. 4,646,288, entitled "Multiline Accumulator/Multiplexer", issued to Shumway discloses a multiplexer that can be used as a central processing control station for conferencing. In the system disclosed by Shumway, the data received from Time Division Multiplexed channels is summed in an accumulator. Shumway discloses a buffer that is alternatively connected to a TDM bus and to the accumulator to receive data from the TDM bus and provide the data to the accumulator. The data summed in the accumulator is then distributed. The accumulator/multiplexer is a simplex system that provides for limited one way communication between a client and the TDM bus.

U.S. Pat. No. 4,575,845, entitled "Time Division Multiplex Conferencer", issued to L. Baranyai et al, discloses a simplex (one-way) digital audio mixing system. The system disclosed by Baranyai performs similarly to that of Shumway described above, except that Baranyai does not disclose storage (i.e. a buffer) of the digital audio data received from the TDM bus prior to providing the data to the accumulator. This lack of storage allows only one opportunity per TDM time frame to acquire data and sum it with other incoming data. Since the data flow in Baranyai is simplex, a second controller is required for full duplex communication.

The prior art systems include several limitations that restrict their use in a digital audio system. In conferencing systems of the prior art, all signals received over the TDM bus have the same gain and are summed before the data is presented to the client. These conference networks of the prior art are limited in that a large number of channels slows the response time of the network. Since there is not buffering, or buffering only prior to the accumulator, the data order is fixed to the same order as the time slots across the bus, and the client has essentially no control over the order in which it will see the data.

The prior art is also limited in that a master clock of the TDM bus is synchronous with a division of time slots on the bus and the sample rate of the data. In these systems, the data transfer rate, the length of each time slot, and the sample rate are directly tied to the master clock rate. These systems do not have flexibility in terms of the number of time slots provided versus sample rate. Once the sample rate is chosen in these systems, the master clock is fixed, or if the master clock is chosen, the sample rate is fixed.

SUMMARY OF THE INVENTION

According to one aspect of the present invention, a network interface module is provided for a time division multiplexed network that transfers data among clients of the network. The network has a system clock signal with a clock rate and period that defines bus cycles of the network. Each of the bus cycles of the network has a number of time slots for transmitting data over the network, each of the time slots corresponding to one channel of the network. The network interface module comprises first and second clock circuits. The first clock circuit generates a first clock signal having a clock rate that is greater than the number of time slots multiplied by the system clock rate, and having a period that defines a duration of each time slot. The first clock signal is asynchronous with the system clock signal. The second clock circuit receives the first clock signal and the system clock signal and generates a start signal indicating a start of a bus cycle.

According to another aspect of the present invention a method is provided for providing timing control for the transfer of data over a time division multiplexed network. The method includes steps of detecting a start of a bus cycle of the network and generating a second clock signal having a period corresponding to a duration of a time slot of the network. The period of the second clock signal, multiplied by the number of time slots of a bus cycle of the network, is less than a duration of the bus cycle.

According to another aspect of the present invention, a network interface module for a time division multiplexed network is provided. The network interface module comprises a client interface circuit, a network interface circuit, a memory, and an indirection table. The indirection table stores relationships between channels of the network and corresponding memory locations within the memory, and provides the relationships to the memory so that data corresponding to a particular channel of the network is stored in a specified memory location.

According to yet another aspect of the present invention, a method for storing and retrieving data in a memory of a time division multiplexed network is provided. The method includes steps of assigning a number of time slots of a bus cycle of the network as either inbound or outbound channels of a client coupled to the memory, and assigning a memory location within the memory for each of the inbound and outbound channels of the client.

According to another aspect of the present invention a network interface module for a time division multiplexed network is provided. The network interface module comprises a memory having a plurality of memory locations for storing data samples of the network, a client interface circuit that provides an interface between a client of the network and the memory, a first register for storing data samples, and a second register for storing data samples. The memory, in a first mode of operation of the network interface module, receives from the client, prior to the start of a bus cycle of the network, first and second addresses respectively corresponding to first and second memory locations of first and second data samples to be read from the memory in the bus cycle. The memory provides the first and second data samples to the first and second registers respectively, so that the data samples can be accessed during the bus cycle without memory access time delays.

In another aspect of the present invention, a method is provided for reading data from a memory of a time division multiplexed network. The method comprises steps of receiving, prior to the start of a bus cycle of the network, first and second addresses corresponding to first and second memory locations of first and second data samples to be read from the memory in the bus cycle, reading the first and second data samples from the memory, storing the data samples in temporary storage locations, and transferring the data samples to a client of the network during the bus cycle.

DESCRIPTION OF THE FIGURES

For a better understanding of the present invention, reference is made to the drawings, which are incorporated herein by reference and in which.

DETAILED DESCRIPTION

I. System Overview

Figure 1:
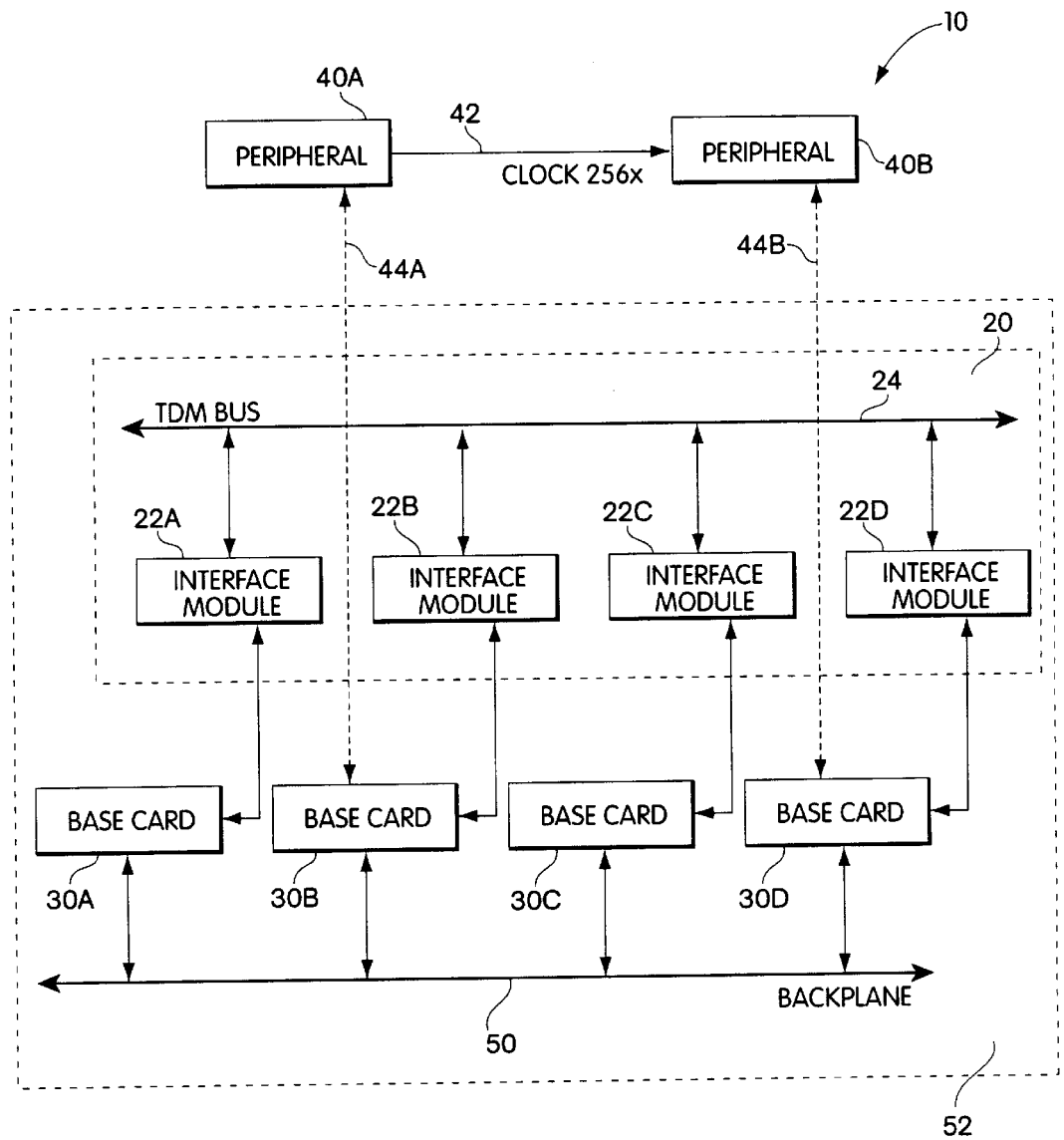
FIG. 1 is a block diagram of a TDM network system according to one embodiment of the present invention.

FIG. 1 is a block diagram of one embodiment of a Time Divisional Multiplexed (TDM) network system of the present invention applied to a modular digital audio system. The TDM network system 10 includes a TDM network 20, base cards 30A, 30B, 30C and 30D, peripherals 40A and 40B, and a system backplane 50.

In one embodiment of the present invention, the TDM network 20, the base cards 30A–30D, and the system bus 50 are contained within a Macintosh II computer, and the backplane 50 consists of a Macintosh NuBus. In another embodiment, the TDM network and the base cards may be installed in a DigiDesign NuBus expansion chassis manufactured by DigiDesign, Menlo Park, Calif. Co-pending application Ser. No. 08/490,457 entitled "SYSTEM AND METHOD FOR PROCESSING DIGITAL AUDIO DATA" provides a further description of the modular digital audio system and is incorporated herein by reference.

In the system shown in FIG. 1, there are four base cards, 30A–30D, the actual number of base cards used in the system is variable to meet a user's specific requirements. The base cards include sources, destinations, and processors for digital audio signals transmitted over the TDM network. The base cards may include functions of audio devices found in a recording studio including equalizers, mixers, synthesizers and samplers. Co-pending application Ser. No. 08/490,459 entitled "SYSTEM AND METHOD FOR DISTRIBUTING PROCESSING AMONG A PLURALITY OF DIGITAL SIGNAL PROCESSORS" provides a further description of signal processing in the base cards and is incorporated herein by reference.

The TDM network 20 consists of network interface modules 22A, 22B, 22C, and 22D and a TDM bus 24. The TDM bus 24, in one embodiment of the present invention, comprises a multi-connector flexible ribbon cable connected to each of the interface modules. Each base card connects to the TDM bus through one of the interface modules. In the system shown in FIG. 1, the interface modules are shown separate from the base cards. However, in a preferred embodiment, the interface modules are piggy back cards mounted directly on the base cards. The interface modules may also be directly incorporated on the base card as discrete components on the base card, as a separate ASIC on the base card, or incorporated within an ASIC particular to the base card's function.

The peripherals 40A and 40B are each shown connected to base cards 30B and 30D respectively. The peripherals provide the interface for external audio signals to the TDM network system and may include devices such as VCRs, film projectors, and audio tape recorders. In the embodiment shown in FIG. 1, only two peripherals are included in the system. The number of peripherals in a system is variable to meet the requirements of a user.

The TDM network system shown in FIG. 1 is used to transfer digital audio data from one base card to another. The TDM network 20 essentially acts as a patch bay for connecting digital audio signals between base cards of the system. Using the system shown in FIG. 1, the digital audio output from one base card may be provided to an input of one, or more than one, other base cards.

In one embodiment, the TDM network is designed to transfer 256 digital audio signals in real time simultaneously. In order to accomplish real time transfer of 256 digital audio signals, one digital sample of each audio signal is transferred per sample period. In order to transfer 256 digital audio signals in real time, 256 samples are transferred per sample period. Time division multiplexing is used such that the sample period is divided into 256 time slots, and one sample from each of the 256 digital audio signals is transferred in one of the time slots in one sample period. Each sample period corresponds to one bus cycle of the TDM network. In a preferred embodiment of the present invention, each base card may access a maximum of 63 input and 63 output channels of the 256 available channels on the network. The set of inbound channels may be entirely different from the set of outbound channels.

II. Network Synchronization

This section describes the system timing in one embodiment of a TDM network system of the present invention. There are two levels of data synchronization in the system. The first level of data synchronization, identified as system synchronization, ensures that all elements of the system are synchronized to the sample period or bus cycle boundaries. The second level of system synchronization, identified as TDM bus synchronization, ensures that the network interface modules identify the location of time slot edges within the sample period and identify the currently active time slot. For each synchronization level, a clock master is designated.

For the system synchronization level, one of the peripherals 40A or 40B is chosen to provide the clock. For the TDM bus synchronization, one of the network interface modules 22A–22D is chosen to provide the clock. In a preferred embodiment of the invention, as described further below, the TDM bus synchronization clock is triggered by the system synchronization clock, however, the transfer of data across the bus otherwise runs asynchronous to the system synchronization clock.

As discussed above, one of the peripherals is chosen to provide the system synchronization clock. The peripherals in a preferred embodiment contain highly accurate quartz timing crystals which oscillate at 256 times the sample rate to provide a clock designated as 256x. In the embodiment shown in FIG. 1, peripheral 40A has been designated as the master peripheral to provide the system synchronization clock. Clock signal 256x is provided over interconnection 42 to peripheral 40B. Peripheral 40A divides clock signal 256x by eight to provide a clock signal 32x. The clock signal 32x is provided to base card 30B over interconnection 44A. Base card 30B is designated as the master base card since it is connected to the peripheral chosen to provide the system synchronization clock. Similarly, peripheral 40B divides the clock signal 256x received from peripheral 40A by eight to produce a clock signal 32x. Peripheral 40B provides the clock signal 32x over interconnection 44B to base card 30D.

The master base card 30B divides the 32x signal by 32 to yield a clock signal designated as 1x. The 1x signal is sent to the network interface module 22B connected to the master base card 30B. The network interface module 22B, connected to the master base card 30B, is designated as the master network interface module. In a preferred embodiment, all the network interface modules have the potential to be the master network interface card, as they all contain the requisite circuitry, but only the network interface module coupled to the master base card will be designated as the master network interface module. All other TDM network interface modules are designated as TDM clock slaves.

Figure 2:
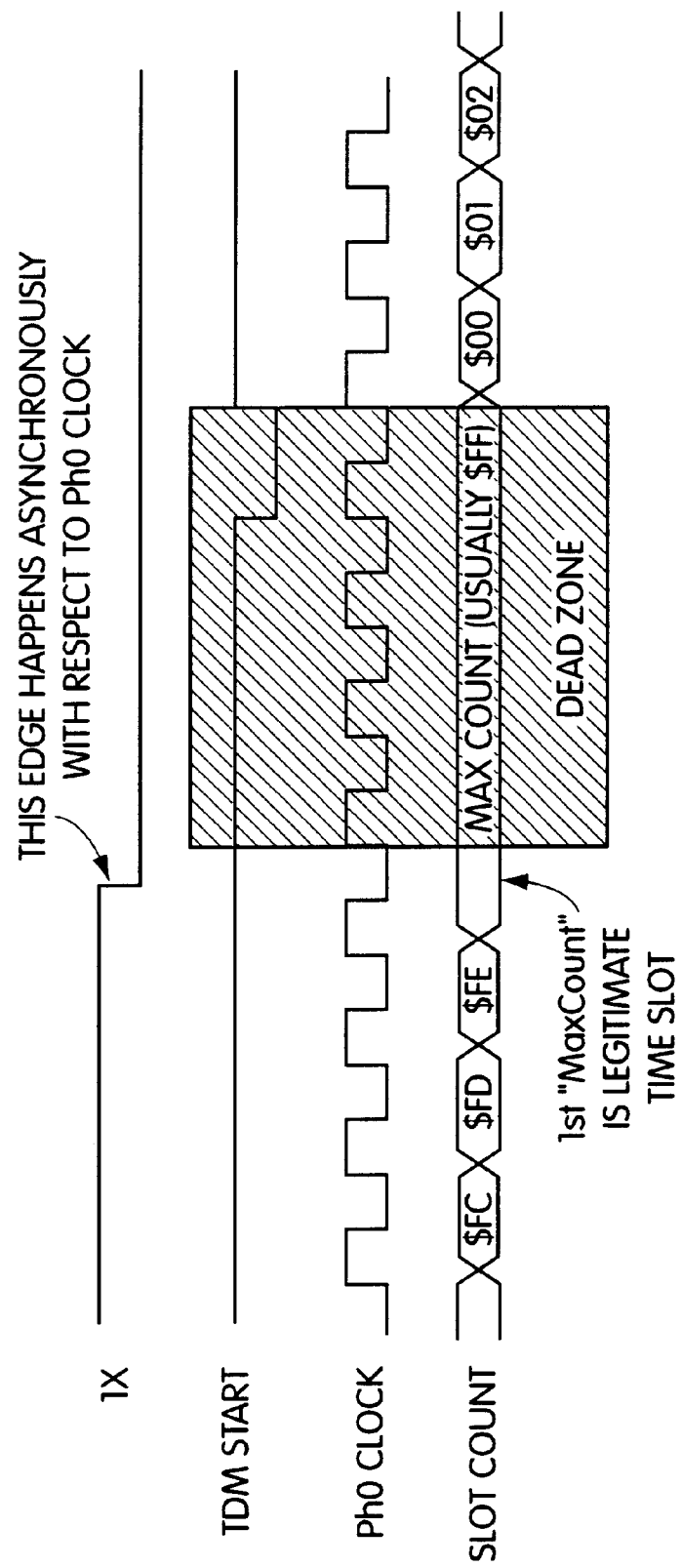
FIG. 2 is a timing diagram of the clock signals of a TDM network system according to one embodiment of the present invention.

In one embodiment of the present invention, the master network interface card has a crystal on board that operates at 55.1724 MHz. This clock gets divided down to yield two 50% duty cycle clocks at 13.793 MHz that are exactly one-quarter clock cycle apart from each other. These clocks are identified as TDM Ph0 clock and TDM Ph1 clock with the TDM Ph0 clock leading TDM Ph1 clock. The Ph0 clock signal is shown in FIG. 2 along with the 1x clock signal and a TDM Start signal. The TDM Start signal is used to reset slot counters inside the network interface modules at the start of a bus cycle.

Figure 3:
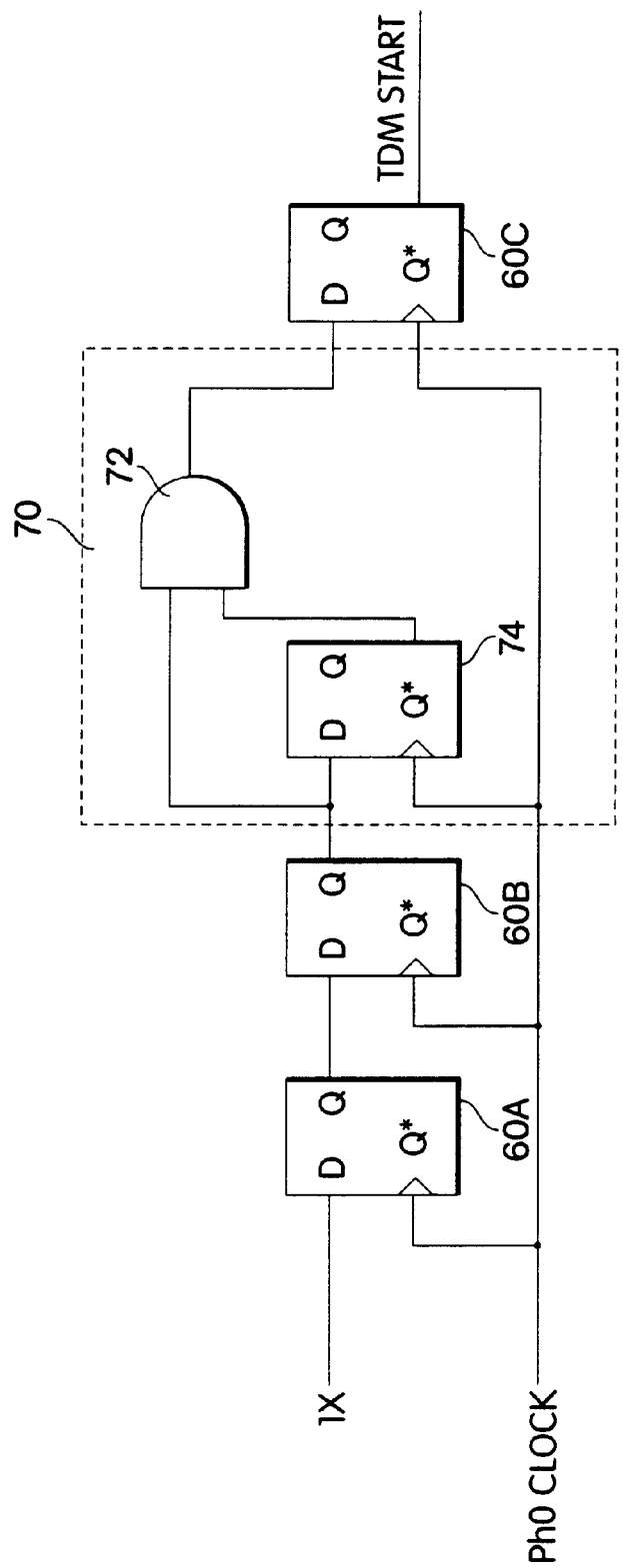
FIG. 3 is a block diagram of a clock generator circuit used in one embodiment of the present invention.

The TDM Start signal is derived from the 1x clock, received from the master base card, and the Ph0 clock. The TDM Start signal is generated in a preferred embodiment using a TDM Start signal generator circuit shown in FIG. 3. The circuit of FIG. 3 consists of three re-timing flip-flops 60A, 60B, and 60C and a leading edge detector 70 consisting of an and gate 72 and a re-timing flip-flop 74. Re-timing flip-flop 60A receives the 1x clock signal and the Ph0 clock signal. A resynchronization of the 1x clock to the Ph0 clock is performed in re-timing flip-flops 60A and 60B. A leading edge of the Ph0 clock is then detected, and the TDM start clock is generated at the output of the third re-timing flip-flop 60C. In this manner, the network interface module uses the 1x signal from the master base card as an asynchronous trigger to generate the TDM Start signal to restart the synchronous TDM bus at each sample period.

The TDM bus is not strictly synchronous to the system clock master. The TDM Start signal occurs just after the 1x clock signal. In one embodiment of the present invention, there are 256 time slots in one sample period. Each time slot coincides with one cycle of the Ph0 clock. The 256x clock signal in the peripheral has a clock rate that is exactly 256 times greater than the clock rate of the 1x clock signal whose period corresponds to the system sample period. The Ph0 clock has a clock rate somewhat faster than the rate of the 256x clock signal. Therefore, 256 time slots occur in less time than the full sample period. The slack time, consisting of the difference in time between the 256 time slots and the sample period, is taken up by a variable length idle period, or dead zone, which is inserted between sample period bursts consisting of 256 time slots each. Because of the relationship between the TDM start signal and the Ph0 clock, there is an integer multiple of periods of the clock during the dead zone as shown in FIG. 2. There are in general a different number of clock periods in the dead zones of successive sample periods, although this number will never vary by more than one clock period from one sample period to the next for a fixed sample period.

The implementation of the asynchronous/synchronous clock scheme in a preferred embodiment of the present invention described above provides several advantages. The number of time slots per sample period may be changed by swapping the crystal used to generate the Ph0 clock in the network interface module for one of lower or higher frequency, as required.

This flexibility is critical in digital audio recording and editing systems where multiple sample rates are necessary due to the varying requirements of broadcast, film, compact discs, multimedia, etc. The network interface module, because of this flexibility, can support a wide variety of sample rates without changing the master clock. This allows one system to be used for a wide variety of tasks without architectural changes. In the prior art systems, it is necessary to change the master clock to provide this flexibility since the master clock is synchronous to the sample rate and the TDM slot division.

The clock scheme, of the embodiment of the present invention described above, also allows a continuously varying system sample period to be used. The network interface module is able to adapt to variations in the sample period by varying the length of the dead zone at the end of the sample period. The ability to adapt to varying sample rates is particularly useful when the peripheral generating the system clock signal comprises mechanical equipment such as VCRs, film projectors, and audio tape recorders. In these peripherals, it is generally difficult to maintain a completely stable clock. The clock instability creates problems in prior art systems that have the sample rate synchronous with the TDM slot divisions and the master clock, both of which are fixed. In prior art systems, if a bus cycle shrinks in time due to clock instability, the length of each of the time slots will also decrease, creating access time violations for devices and memories connected to the bus as the data to and from the bus must be transmitted and received in less time.

In the embodiment of the present invention described above, instabilities of the system clock are transparent to the client as the network interface module will adjust for variations in the sample clock by increasing or decreasing the length of the dead zone. The length of each time slot remains constant despite variations in the sample clock. For extreme variations in the sample clock, the number of time slots per bus cycle may be reduced, but the length of the time slots remains constant. This allows for the sample rate to drift and the bus to remain synchronous with the mechanical equipment.

In a preferred embodiment of the present invention, each of the interface network modules has an internal register, designated as max count, which may be programmed for any different number (designated as the max count value) of time slots per sample period. Internal counters in the network interface module start counting synchronously with the Ph0 clock upon receipt of the TDM start signal. These counters stop counting once they reach the max count value, and remain at the max count value for the duration of the dead zone. Upon arrival of the next TDM start pulse, the counters again begin counting from zero. These counters provide the ability to vary the number of time slots per sample period by changing only the programmed max count value.

The three timing signals generated in the network interface card, Ph0 clock, Ph1 clock, and TDM start, as well as the 1× clock generated in the master data bus card, a 2× clock generated in the master data bus card, and the 32× clock received from the peripheral, are transmitted over the network bus to each of the interface network cards. Each network interface card drives its output data to the bus at the rising edge of the Ph0 clock. The receiving network interface card uses the falling edge of the Ph1 clock to latch in data from the network. This ensures that there is no danger of missing data due to clock skew depending on data transmission direction out on the bus.

III. Network Interface Modules

Figure 4:
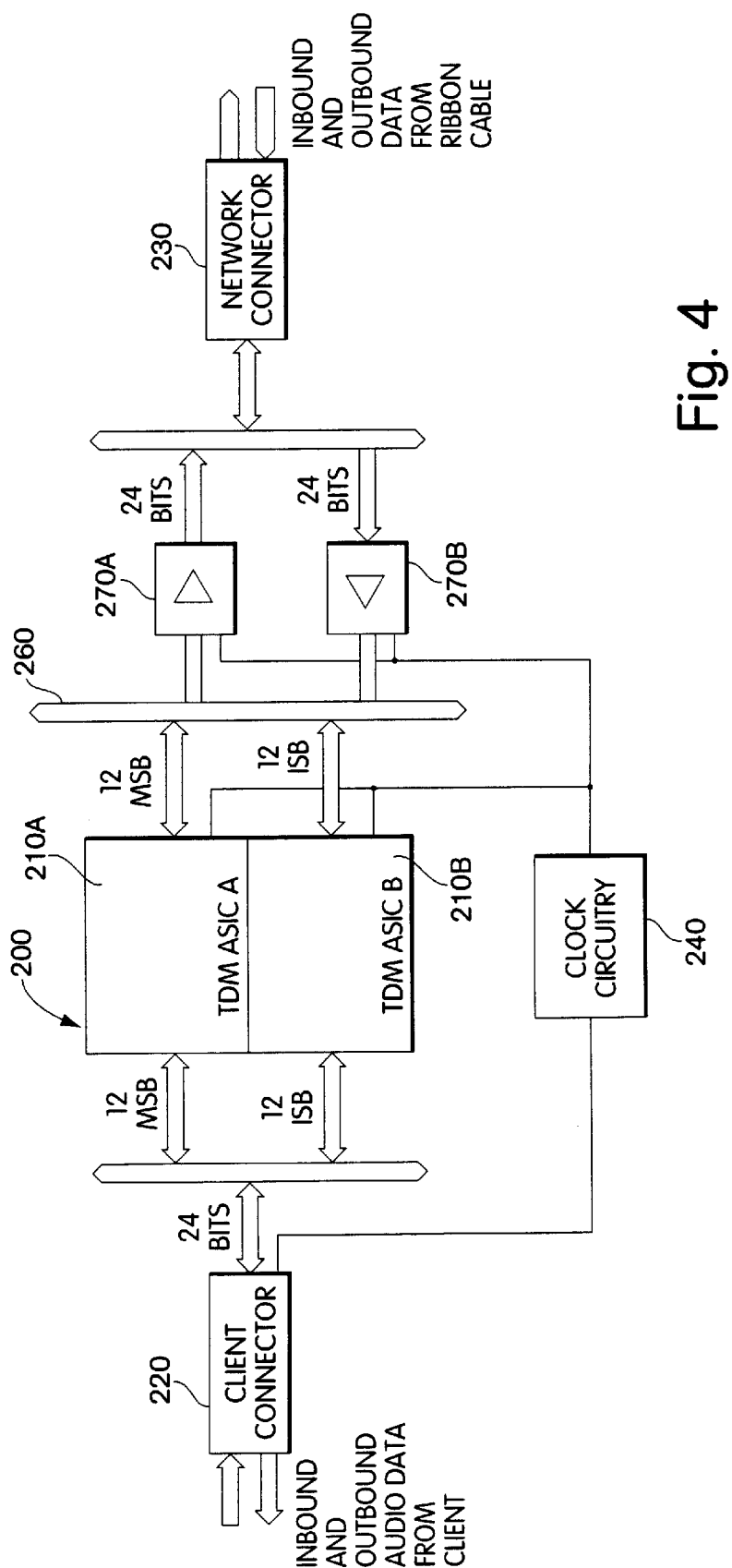
FIG. 4 is a block diagram of a network interface module of one embodiment of the present invention.

Referring to FIG. 1, the network interface modules 22A–22D provide the interface to the TDM bus 24 for each node of the TDM network. Each network interface module acts as a node controller for the node of the network. A block diagram of a network interface module 22 in accordance with one embodiment of the present inventions is shown in FIG. 4. The network interface module includes a TDM ASIC pair 200 comprised of TDM ASICS 210A and 210B, a client connector 220, a TDM bus connector 230, TDM buffers 270A and 270B, an internal TDM bus 260, and a clock circuit 240. The clock circuit 240 performs the network interface module clocking functions described above under the overall system timing description.

Figure 5:
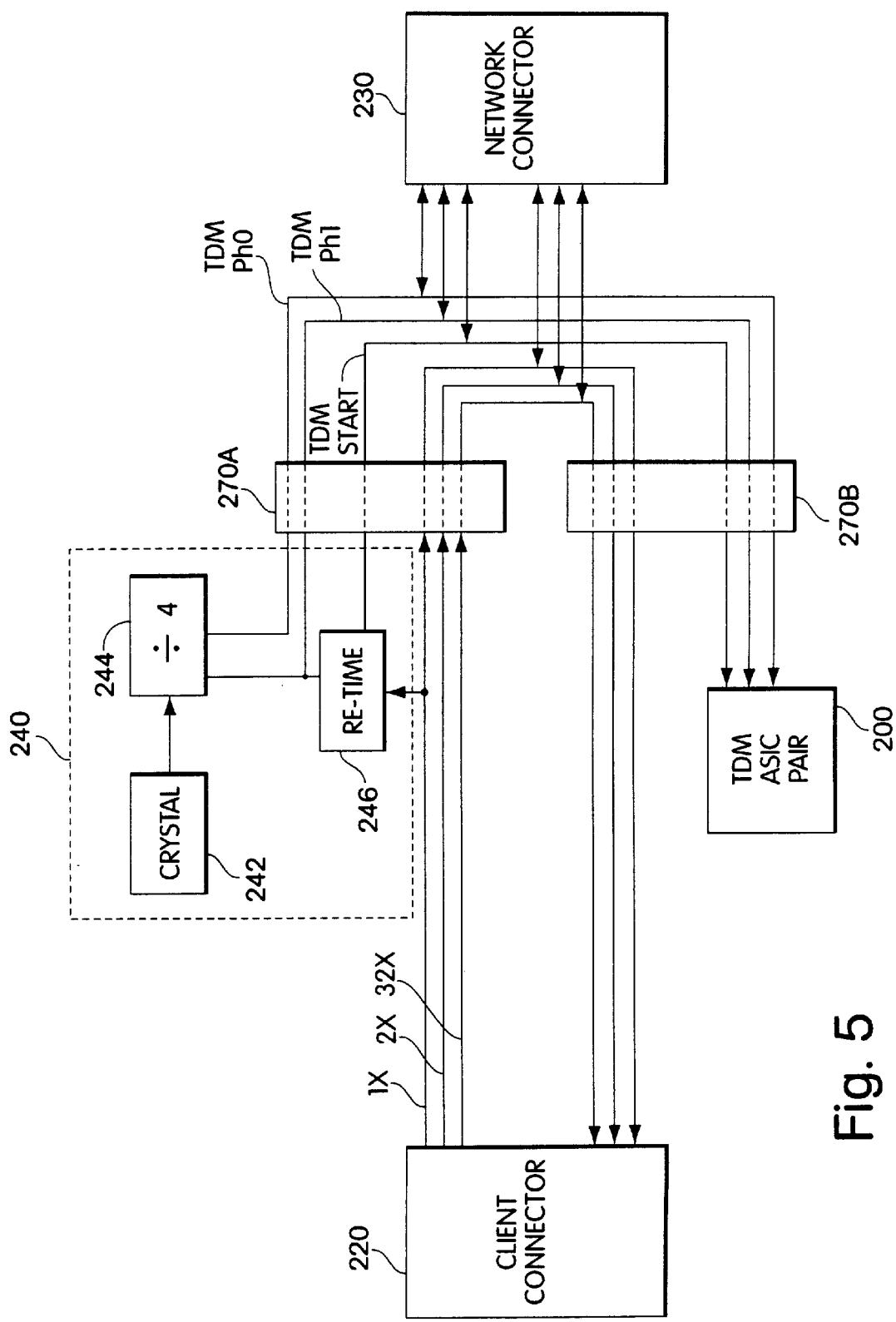
FIG. 5 is a block diagram of the clock circuitry of a network interface module of one embodiment of the present invention.

FIG. 5 shows the clock circuit 240 in greater detail, as well as the individual clock connections between the client, the network interface module, and the TDM network cable. The clock circuit 240 includes a 55.1724 MHz crystal circuit 242, a divide by 4 circuit 244 and a re-timing circuit 246. The re-timing circuit includes the TDM Start signal generator circuit 80 discussed previously with reference to FIG. 3. As shown in FIG. 5, a network interface module has the capability to provide six clocks out the TDM ribbon cable. Three of the clocks (1×, 2× and 32×) are related to system synchronization, and are provided from the master base card. The other three clocks (Ph0 clock, Ph1 clock, and TDM start) provide TDM bus synchronization and are generated on the master network interface module. The three TDM clocks are provided out on the bus only by the master network interface module, but are received by all of the network interface modules on the bus.

The transmission of audio data through the network interface module will now be described with reference to FIG. 4. In a preferred embodiment of the present invention, the audio samples are comprised of 24 bits. In a first bus cycle, outbound data from the client is received at the client connector 220 and is transferred to the TDM ASIC pair 200. Twelve most significant bits of the outbound data are transferred to TDM ASIC 210A and twelve least significant bits of the outbound data are transferred to TDM ASIC 210B. In a second bus cycle, the outbound data is transferred from the TDM ASIC pair 210 over an internal TDM bus 260 to the outbound TDM buffer 270A for transfer over the TDM bus through the TDM connector 230. Similarly, in a first bus cycle, inbound data, received from the TDM bus, is temporarily stored in TDM inbound buffer 270B, and then transferred over the internal TDM bus 260 to the TDM ASIC pair 200 where the twelve most significant bits are transferred to TDM ASIC 210A and the twelve least significant bits are transferred to TDM ASIC 210B. In the second bus cycle, the inbound data is then transferred through the client connector 220 to the client.

IV. TDM ASIC

A general functional description of one embodiment of a network interface module in accordance with the present invention has been provided above. A detailed description of the TDM ASIC pair of one embodiment of the present invention is further described below. In a preferred embodiment, two identical ASICs are used in the network interface module. Each of the ASICs perform identical functions for 12 bits of the 24 bit audio data words. It should be understood that the present invention is not limited to the embodiment described using two ASICs. Those skilled in the art will recognize that only one ASIC, or more than two ASICs could be used in the network interface module to provide the functions of the pair of ASICs in the illustrative embodiment. Also, the components contained within the ASICs may be provided as discrete components.

Figure 6:
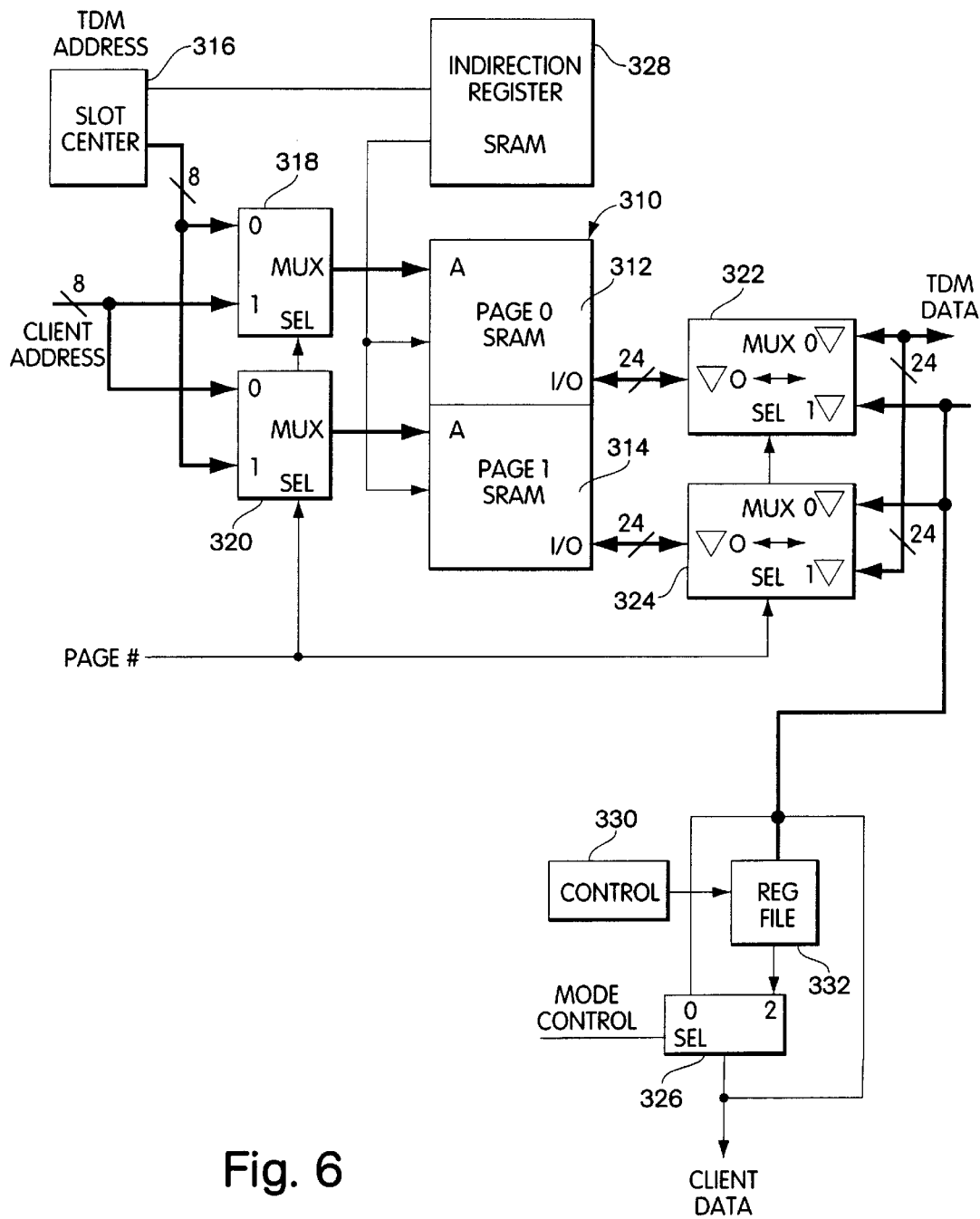
FIG. 6 is a block diagram of a TDM ASIC in accordance with one embodiment of the present invention.

FIG. 6 shows the TDM architecture of each of the TDM ASICS 210A and 210B shown in FIG. 4. Each TDM ASIC includes an SRAM 310 comprised of two pages 312 and 314, a slot counter 316, an indirection register 326, MUXes 318–326, a register file 332 containing data registers, and a control circuit 330.

The function of the TDM ASIC will now be described. As shown in FIG. 6, each TDM ASIC includes a slot counter 316. The slot counter is set to zero at the start of each new bus cycle and is incremented by the TDM bus slot clock Ph0 so that the slot counter always has a value corresponding to the active time slot of the TDM network.

The indirection register 328 in a preferred embodiment comprises a 256×8indirection SRAM and functions as a slot assignment table. The slot assignment table is preprogrammed with values corresponding to the channels of the 256 network channels that are designated as inbound and outbound channels for the client connected to the network interface module comprising the ASIC. The slot assignment table also contains addressing information for mapping each designated channel of the client to a corresponding location in the memory 310.

Figure 7:
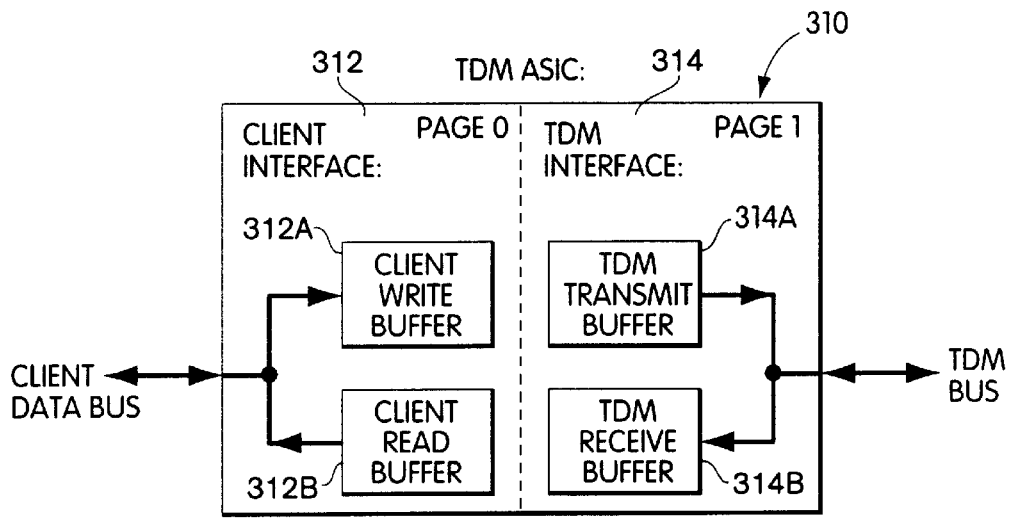
FIG. 7 is a diagram of an SRAM memory used in the TDM ASIC of FIG. 6 in one embodiment of the present invention.

The core of the TDM ASIC is the memory 310. The two pages of the memory 312 and 314 are shared on a 50% duty cycle between a client interface and a TDM bus interface. From the client interface, the memory appears as a double buffer that is page swapped every sample period of the TDM bus. From the TDM bus interface, the memory also appears as a double buffer, except that the TDM bus interface always accesses the page opposite the one that the client is accessing. Each page of the memory is divided into an outbound RAM and an inbound RAM as shown in FIG. 7, creating four physical RAM blocks 312A, 312B, 314A, and 314B.

Figure 8:
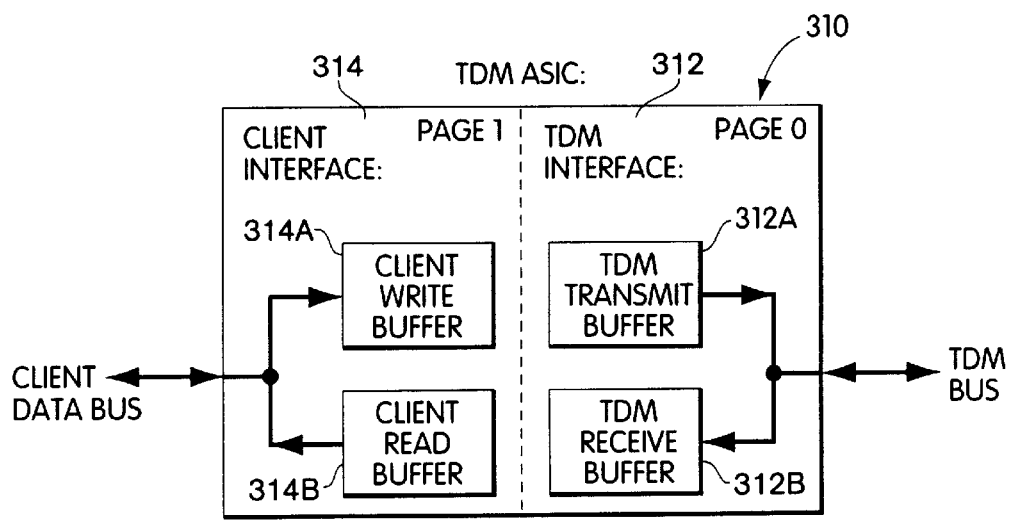
FIG. 8 is a diagram of the SRAM memory of FIG. 7 demonstrating a page swap in accordance with one embodiment of the present invention.

During a first bus cycle, outbound data from the client is written to memory block 312A of page 0, outbound data is read from memory block 314A and transmitted out on the TDM bus, inbound data is written into memory block 314B from the TDM bus, and inbound data is read from the memory block 312B and transferred to the client. At the end of the bus cycle, the pages of the memory flip to that shown in FIG. 8. Page 1 now provides the client interface and page 0 provides the TDM interface. In a second bus cycle, the outbound data that was stored in block 312A in the previous bus cycle is read from memory block 312A and transmitted out on the data bus, the inbound data that was read into memory block 314B in the previous bus cycle is transferred to the client, a new set of outbound data is written into memory block 314A from the client and a new set of inbound data is from the TDM bus is written into memory block 312B. The pages contained within the memory flip at the end of each bus cycle.

As described above, the physical blocks of memory inside the TDM ASIC are not permanently assigned to either the TDM interface or the client interface. Their assignment switches with each bus cycle. The MUXes 318–324 along with the slot assignment table and the slot counter 316 are used to control the flow of data to and from the memory 310 to ensure that data is written to, and read from, the proper memory locations. The register file 332, the control circuit 330 and the mux 326 are used in a FIFO mode of the ASIC described further below. The register file 332 is used to store prefetched data samples under the control of the control circuit 330. The mux 326, responsive to a mode control signal, provides the client with either the prefetched data samples or data from the memory 310.

The client is oblivious to the fact that there are four physical blocks of RAM inside the TDM ASIC. The client uses the same address base to access what it sees as a single RAM, addressed by channel number, containing multiple inbound and outbound channels. The client may write a new set of audio samples into the RAM every sample period, and it may read a different set of audio samples out of the TDM ASIC every sample period.

In one embodiment of the present invention, there are two modes by which the client can write and read to the memory. In the first mode, random access mode, the memory 310 appears as regular random access memory. The memory is read by the client by providing an address to the memory, and receiving the data stored in the location corresponding to that address.

The second mode, FIFO mode, reduces the read access time of the inbound audio data. In the FIFO mode, two reads for a second bus cycle are prefetched during the dead zone at the end of a first bus cycle. The data corresponding to the addresses of the first two reads are stored in a first register and a second register contained within the register file 332. At the start of the second bus cycle, when the first read from the client occurs, the data corresponding to the first read will be waiting in the first register. RAM access time does not impede the timing of the read. The first read triggers a third internal read which begins immediately and continues after the client has gone away. Data from the second register is transferred into the first register, and data corresponding to the third read is stored in the second register. When the client initiates the second read, the data for the second read is available in the first buffer, and the second read triggers the next internal read. The write timing does not benefit from the FIFO mode in the same way, however, the write addresses can be precalculated so that a write takes less time to occur than in normal random access mode.

Both the FIFO mode and the random access mode become very flexible in combination with the slot assignment table. In random access mode, the slot assignment table can be programmed so that the mapping of the TDM time slots in the memory reorders or groups the time slots for random and sequential access. This is also useful for FIFO mode where access to the data in FIFO form is desired but the data is not contained within contiguous or sequential time slots.

Random access mode is important in distributed systems where there is no guarantee that the client will have access to the data in sequential order and may only know where the data is located in the RAM. In prior art systems, the data is only supplied in time slot order which limits the type of processing algorithms that the client can run. For example, when a client is running multiple DSP algorithms on multiple data streams, it is highly unlikely that the data needed for algorithm no. 1 will appear before the data needed for algorithm no. 2 and so on. The data would most likely not be sequential or adjacent but scrambled and separated by other data used for other processing functions or by other clients for their own algorithms.

The use of the indirection table along with random access mode alleviates the problem of prior art systems described above. Data stored in the memory can be grouped according to algorithm or client (in the case where the node controller is shared). Once the indirection table is created, it is transparent to the client what time slot is being read from or written to. The client only knows that it is accessing data at a particular address in the RAM.

The FIFO mode is particularly useful for clients utilizing algorithms that require fast sequential access or where a great deal of data needs to be processed as fast as possible. The FIFO mode along with the indirection table allows extremely fast data access. The indirection table can be used to map to what appears to be sequential locations in the memory, that can be a accessed through FIFO mode. This allows a client to have extremely fast access to very different and random locations in the memory.

Emodiments of the present invention have been described with reference to a time domain multiplex network used for transferring digital audio signals. It should be understood that the invention is applicable to the transfer of data other than digital audio data over a TDM network. Also, in an illustrative embodiment, the network comprises 256 channels and each network interface module provides a client access to 63 of the channels for inbound data and 63 of the channels for outbound data. It should be understood that the invention is applicable to networks having a number of channels other than 256, and for clients having access to a number of channels other than 126. Also, multiple clients can be supported from one network interface module, with each of the multiple clients being assigned a subset of the channels assigned to the network interface module.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A network interface module for a time-division network for transferring data among clients of the network, the network having a system clock signal with a clock rate and period that define bus cycles of the network, each of the bus cycles having a number of time slots for transmitting data over the network, the network interface module comprising:

a first clock circuit that generates a first clock signal having a clock rate that is greater than the number of time slots in a bus cycle multiplied by the clock rate of the system clock signal, and having a period that defines a duration of each time slot, the first clock signal being asynchronous with the system clock signal;

a second clock circuit, coupled to the first clock circuit to receive the first clock signal, and responsive to the system clock signal to generate a start signal, synchronous with the first clock signal, indicating a start of a bus cycle.

2. A method for transmitting data over a time division multiplexed network among clients of the network, the network having a system clock signal with a clock rate and period that define a start and duration of a bus cycle of the network, the bus cycle having a number of time slots for transmitting data over the network, the method comprising steps of:

detecting the start of the bus cycle;

generating a first clock signal, asynchronous with the system clock signal, having a period corresponding to a duration of each of the time slots of the network, the period of the first clock signal multiplied by the number of time slots of the bus cycle being less than the duration of the bus cycle; and transmitting data over the network during one of the time slots.

3. The network interface module of claim 1, further comprising a counter, coupled to the first clock circuit and the second clock circuit, that upon receipt of the start signal counts periods of the first clock signal to generate a counter value.

4. The network interface module of claim 3, wherein the counter is adapted to stop counting when the counter value is equal to a maximum count value which is equal to the number of time slots in each bus cycle.

5. The network interface module of claim 4, wherein the maximum count value of the counter is programmable to change the number of time slots in each bus cycle.

6. The network interface module of claim 5, wherein the maximum count value is reset upon receipt of the start signal.

7. The network interface module of claim 1, further comprising a network interface circuit for coupling to other network interface modules of the time-division network to provide the first clock signal.

8. The network interface module of claim 1, wherein the second clock circuit includes a plurality of flip-flops.

9. The method of claim 2, further comprising a step of generating a start signal after the start of the bus cycle, the start signal being asynchronous with the system clock signal and synchronous with the first clock signal.

10. The method of claim 9, further comprising a step of counting periods of the first clock signal after generation of the start signal to generate a counter value until the counter value reaches a maximum count value.

11. The method of claim 10, wherein the maximum count value is equal to the number of time slots in the bus cycle.

12. The method of claim 11, wherein each of the time slots corresponds to one channel of the network, wherein the counter value corresponds to a present active channel of the network, and wherein the step of transmitting includes steps of using the counter value to determine the present active channel of the network and transmitting data for the present active channel of the network.

13. The method of claim 12, further comprising a step of resetting the maximum count value upon receipt of the start signal.

14. The method of claim 10, further comprising a step of adjusting the maximum count value based on changes in the period of the system clock signal.

15. A TDM network system for transferring data among clients of the network during time slots of a bus cycle, the TDM network system comprising:

a plurality of network interface circuits each having at least a first interface;

a TDM bus coupled to the first interface of each of the plurality of interface circuits;

a plurality of peripheral interfaces for coupling to external peripherals, each of the plurality of interfaces being coupled to one of the plurality of network interface circuits; and wherein the bus cycle is defined by a period of a system clock signal having a system clock rate, and wherein at least a first one of the plurality of network interface circuits includes a first clock circuit that generates a first clock signal having a period that defines a duration of each time slot, the first clock signal being asynchronous with the system clock signal.

16. The TDM network system of claim 15, wherein the bus cycle has a number of time slots for transmitting data over the network, and wherein a clock rate of the first clock signal is greater than a product of the number of time slots in the bus cycle and the system clock rate.

17. The TDM network system of claim 16, wherein the first network interface circuit further includes a second clock circuit, coupled to the first clock circuit to receive the first clock signal, and responsive to the system clock signal to generate a start signal, synchronous with the first clock signal, indicating a start of the bus cycle.

18. The TDM network system of claim 17, wherein the first network interface circuit includes a circuit for deriving the system clock signal based on a signal received from one of the external peripherals.

19. The TDM network system of claim 18, wherein the first network interface circuit further includes a counter, coupled to the first clock circuit and the second clock circuit, that upon receipt of the start signal counts periods of the first clock signal to generate a counter value.

20. The TDM network system of claim 19, wherein the counter is adapted to stop counting when the counter value is equal to a maximum count value which is equal to the number of time slots in the bus cycle.

21. The TDM network system of claim 20, wherein the first network interface circuit is adapted to provide the first clock signal to at least a second one of the plurality of network interface circuits over the TDM bus.

22. The TDM network system of claim 21, further comprising a plurality of audio processing circuits coupled to the TDM bus through the plurality of network interface circuits, the audio processing circuits being adapted to process audio data transmitted over the TDM bus.

23. The TDM network system of claim 22, wherein each of the time slots corresponds to a channel of the TDM network system, and wherein at least the first network interface circuit further includes:

a client interface circuit that receives outbound data from one of the audio processing circuits and provides inbound data to one of the audio processing circuits;

a bus interface circuit that receives inbound data from the TDM bus and provides outbound data to the TDM bus; and a memory, coupled to the client interface circuit and the bus interface circuit, that stores the inbound data and the outbound data.

24. The TDM network system of claim 23, wherein at least the first network interface circuit further includes an indirection table that maps channels of the TDM network system to corresponding memory locations within the memory.

25. The TDM network system of claim 24, wherein at least the first network interface circuit further includes a memory access circuit that allows access to the memory in one of a first mode and a second mode, wherein in the first mode, locations in the memory are accessed sequentially, and in the second mode, locations in the memory are accessed in a random manner based on requests received through the client interface circuit.

26. The TDM network system of claim 25, wherein the audio data is transmitted over the TDM bus as digital samples of data such that each digital sample occupies one time slot.

27. The TDM network system of claim 15, wherein the first network interface circuit is adapted to provide the first clock signal to at least a second one of the plurality of network interface circuits over the TDM bus.

28. The TDM network system of claim 15, further comprising a plurality of audio processing circuits coupled to the TDM bus through the plurality of network interface circuits, the audio processing circuits being adapted to process audio data transmitted over the TDM bus.

29. The TDM network system of claim 28, wherein each of the time slots corresponds to a channel of the TDM network system, and wherein at least the first network interface circuit further includes:

a client interface circuit that receives outbound data from one of the audio processing circuits and provides inbound data to one of the audio processing circuits;

a bus interface circuit that receives inbound data from the TDM bus and provides outbound data to the TDM bus; and a memory, coupled to the client interface circuit and the bus interface circuit, that stores the inbound data and the outbound data.

30. The TDM network system of claim 29, wherein at least the first network interface circuit further includes an indirection table that maps channels of the network system to corresponding memory locations within the memory.

31. The TDM network system of claim 30, wherein at least the first network interface circuit further includes a memory access circuit that allows access to the memory in one of a first mode and a second mode, wherein in the first mode, locations in the memory are accessed sequentially, and in the second mode, locations in the memory are accessed in a random manner based on requests received through the client interface circuit.

32. The TDM network system of claim 31, wherein the audio data is transmitted over the TDM bus as digital samples of data such that each digital sample occupies one time slot.

* * * * *

UNITED STATES PATENT AND TRADEMARK OFFICE
CERTIFICATE OF CORRECTION

PATENT NO. : 6,212,197 B1
DATED : April 3, 2001
INVENTOR(S) : Steven G. Christensen et al.

It is certified that error appears in the above-identified patent and that said Letters Patent is hereby corrected as shown below:

<u>Title page, Item [56], under OTHER PUBLICATIONS,</u>
Line 2, "1895" should be -- 1985 --;
After line 9, should be inserted -- An Audio Engineering Society Preprint, Presenyted at the 91st Convention October 4-8, 1991, New York, An Introduction to Stream Computer Architecture", Gary W. Schwede, 3189 (M-6) 7M/M-6. --.

Signed and Sealed this

Ninth Day of October, 2001

Attest:

*Nicholas P. Godici*

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO. : 6,212,197 B1
DATED : April 3, 2001
INVENTOR(S) : Steven G. Christensen et al.

It is certified that error appears in the above-identified patent and that said Letters Patent is hereby corrected as shown below:

Title page,
Item [56], under OTHER PUBLICATIONS, line 2, "1895" should be -- 1985 -- ;
After line 9, should be inserted -- An Audio Engineering Society Preprint, Presented at the 91st Convention October 4-8, 1991, New York, An Introduction to Stream Computer Architecture", Gary W. Schwede, 3189 (M-6) 7M/M-6. --.

Column 3,
Line 23, "invention" should be -- invention; -- .

Column 8,
Line 36, "256x8indirection" should be -- 256x8 indirection --.

THIS CERTIFICATE SUPERCEDES CERTIFICATE OF CORRECTION ISSUED OCTOBER 9, 2001.

Signed and Sealed this

Twentieth Day of November, 2001

Attest:

NICHOLAS P. GODICI
*Attesting Officer*   *Acting Director of the United States Patent and Trademark Office*